United States Patent
Seibert et al.

[11] Patent Number: 6,117,800
[45] Date of Patent: Sep. 12, 2000

[54] SURGICAL GOWN MATERIAL

[75] Inventors: Leslie E. Seibert, Fayetteville; Prashant Chawla, Morrow, both of Ga.

[73] Assignee: Encompass Group, L.L.C.

[21] Appl. No.: 08/230,825

[22] Filed: Apr. 21, 1994

[51] Int. Cl.[7] .................................................. B32B 5/18
[52] U.S. Cl. ............................ 442/77; 442/89; 442/164; 442/263; 442/286; 442/318; 428/315.9; 428/317.1; 428/317.7
[58] Field of Search .................................. 428/252, 253, 428/286, 308.4, 315.9, 317.1, 317.7; 442/77, 89, 164, 263, 286, 318

[56] References Cited

U.S. PATENT DOCUMENTS

| | | | |
|---|---|---|---|
| 3,410,266 | 11/1968 | Krzewinski | 128/132 |
| 3,745,057 | 7/1973 | Loft | 156/77 |
| 4,433,026 | 2/1984 | Molde | 428/315.9 |
| 4,961,985 | 10/1990 | Henn | 428/315.9 |
| 5,204,156 | 4/1993 | Lumb | 428/315.9 |
| 5,268,212 | 12/1993 | Lumb | 428/315.9 |

*Primary Examiner*—Jenna Davis
*Attorney, Agent, or Firm*—Kennedy, Davis & Hodge LLP

[57] ABSTRACT

A liquid and viral impermeable material (10) has a core (11) having one side overlaid with a microdenier polyester fabric (13) and an opposite side overlaid with a knitted polyester fabric (14). The core is comprised of two layers of microporous urethane film (16) and (17) bonded to each other with a layer of breathable, urethane adhesive (19). The material is useful in constructing surgical and medical garments.

12 Claims, 1 Drawing Sheet

SURGICAL GOWN MATERIAL

TECHNICAL FIELD

This invention relates to materials for the manufacture of medical and surgical garments which inhibit the passage of liquids and viruses therethrough.

BACKGROUND OF THE INVENTION

Medical professionals such as physicians, surgeons medical technicians and nurses, often wear protective clothing to shield them from bodily fluids expelled from patients. Typically, this type of clothing is manufactured in the form of medical gowns, laboratory coats, face masks and the like.

In the past, medical gowns have been made of woven cotton materials. However, this type of material did not prevent the passage of fluids. Hence, in an effort to restrict the passage of fluids, garments have more recently been made of blends of cotton and polyester. However, this material still remains semi-permeable to fluids.

In a further effort to prevent fluid passage a fluorocarbon finish has been applied to polyester cotton blend materials. While this initially aids in resisting fluid passage, the fluorocarbon finish quickly deteriorates in the intense and prolonged environmental heat produced during hot water washing and steam sterilization of garments. Furthermore, fluids upon the surface of the material may still pass through when pressure is applied to the material as, for example, when a surgeon wearing the gown leans against an operating table.

It has also been desirable for medical garments to be capable of protecting the wearer from viruses. The aforementioned materials have not possessed this capability. However, a material which is both viral resistant and liquid resistant has been developed by W. L. Gore Associates, Inc. of Newark, Del. and sold under the name GORE-TEX, and more recently GORE. This material is comprised of a polytetrafluoroethalene film that is coated on each side with a hydrophobic coating such as that sold by DuPont Polymers of Wilmington, Del. under the name HYTREL. However, with a number of washing and sterilization cycles this material also deteriorates so as to allow the passage of liquids and viruses therethrough. This material is also quite expensive.

Accordingly, it is seen that a need remains for a liquid and viral impermeable material with enhanced resistance to degradation during washing and steam sterilization and which may be manufactured on a cost efficient basis. It is to the provision of such therefore that the present invention is primarily directed.

SUMMARY OF THE INVENTION

In a preferred form of the invention a material for use in the manufacture of surgical gowns and the like comprises two sheets of microporous plastic film bonded together with an adhesive to provide a laminate core which has been found to provide a breathable yet substantially liquid and viral impervious core. The core is covered with fabric for protection and wearability.

DETAILED DESCRIPTION

Figure 1:
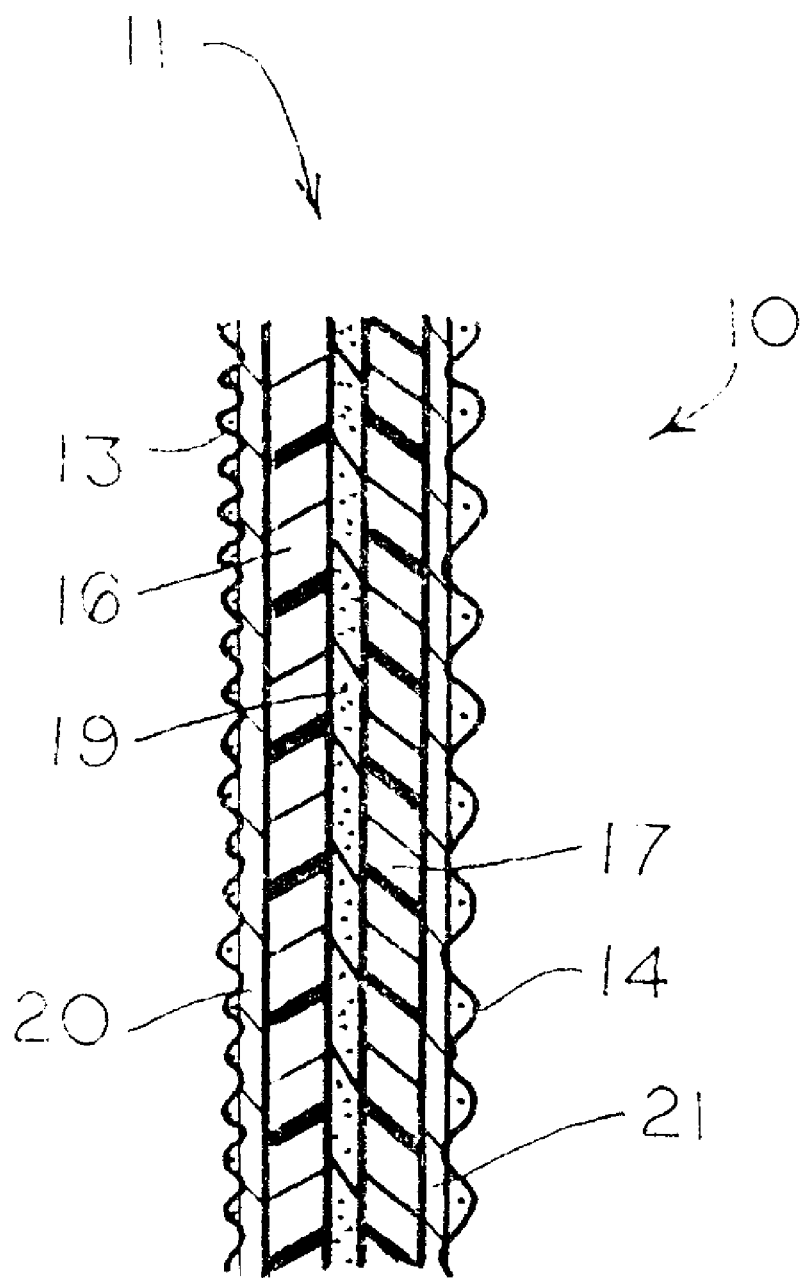
FIG. 1 is a diagrammatic view, in cross-sectional, of a material that embodies principles of the invention in its preferred form.

With reference to FIG. 1, there is shown a material 10 in sheet form that is substantially impermeable to liquids and viruses. The material 10 has a two-ply laminated core 11 sandwiched between an outer layer of microdenier, polyester, woven fabric 13 adhered to one side of the core 11 and an outer layer of knitted, polyester fabric 14 adhered to the opposite side of the core. The core itself is comprised of two, 1 mil thick layers of microporous polyurethane film 16 and 17 such as that sold by Porvair of Kingslynn, England under the name PORELLE. By the term microporous is meant pores of a size generally less than 1000 nanometers. Films 16 and 17 are bonded to each other with a substantially continuous, ¼ mil thick layer of a breathable, urethane adhesive 19 such as that made by National Starch Company, product no. 70-7799.

The material 10 is manufactured by applying a layer of the urethane adhesive 20 to the outside of film 16, overlaying the coated film with fabric 13, pressing the film and fabric together as between two press rollers of a lamination machine, and allowing the adhesive to set. The layer of urethane adhesive 19 is then evenly applied in a conventional atomization process over the inside surface of polyurethane film 16. The polyurethane film 17 is next brought into contact with the adhesive layer 19 and pressed against it and the film 16. The adhesive layer 19 is allowed time to set. Finally, the layer of urethane adhesive 21 is applied to the outside surface of film 17 and the knitted polyester fabric layer 14 brought into contact and pressed against it and the film 17. The layers of adhesive is then allowed also to cure and set, thereby completing the manufacturing process.

For use the material is constructed into a garment with the microdenier polyester fabric 13 providing the garment exterior surface and the knitted polyester fabric 14 providing its interior surface. The microdenier fabric 13 provides an aesthetically pleasing outer surface which also provides an initial hydrophobic layer that repels liquids. The knitted polyester fabric 14 provides a flexible inside layer of material which is comfortable to the touch.

The microporous film layers 16 and 17 have average pore sizes of approximately 100 nanometers. As the adhesive is applied to the film it migrates into these pores to form a continuous layer between the two layers of film. As the adhesive itself is breathable, the two films and the adhesive layers allow air molecules to pass through them, thus making the entire material 10 breathable and hence comfortable for the wearer. The porosity of the microporous film, however, is such as to prevent the passage of most viruses when constructed into a two ply layer with the adhesive therebetween. Therefore, when those viruses which are smaller than the pores of the film may still migrate through the film to the adhesive layer, the adhesive layer apparently prevents the further passage of these remaining viruses because its porosity is too small to allow viruses to migrate therethrough once the adhesive has set. By restricting the majority of the viruses with the film barrier, similarly to a pre-filter, the pores of the film and the adhesive layer remain unobstructed by viruses so as to allow the free migration of air molecules through the material to provide good material breathability.

The outer layers of fabric 13 and 14 protect the laminated film core 11 from damage, such as from scratching, which may occur when the garment is worn. This protects the core from being damaged which would reduce its effectiveness as a barrier to the passage of liquids and viruses. The fabric layers also prevent the core from thermally bonding to itself during the intense heat of washing and sterilization of the garment by preventing contact of the film to itself upon folding.

The knitted polyester fabric layer 14 may alternatively be made of a woven polyester or a blend comprised of a polyester. Also, a looser knit or woven material may be used as an alternative to the microdenier polyester fabric 13.

Testing of the material for liquid arresting efficiency was done in accordance with the test protocol set forth in ASTM-ES21 of the American Society for Testing and Materials. A sheet of material 10 measuring 70 mm by 70 mm having 1 mil thick layers 16 and 17 of microporous film with pore sizes of approximately 100 nanometers was found to pass the ASTM-ES21 test by preventing liquid passage. Testing of the material was done in accordance with the test protocol set forth in ASTM-ES22 of the American Society of Testing and Materials. This material was also found to pass the ASTM-ES22 test by preventing the passage of viruses.

From the foregoing it is seen that a liquid and viral substantially impermeable material for use in the manufacture of surgical gowns and the like is now provided which overcomes problems long associated with those of the prior art. It should however be understood that the just described embodiment merely illustrates principles of the invention in its preferred form. Many modifications, additions and deletions other than those expressly identified may be made thereto without departure from the spirit and scope of the invention as set forth in the following claims.

What is claimed is:

1. A material for use in the manufacture of surgical gowns and the like and which comprises two sheets of microporous plastic film bonded together with an adhesive, the plastic film having pores of a sufficient size such that the adhesive migrates into the pores forming a continuous layer between the two sheets of film to provide a breathable but substantially liquid and viral impervious laminated core, and two layers of fabric that cover and protect said core.

2. The material of claim 1 wherein said microporous plastic film is a polyurethane film.

3. The material of claim 1 wherein said adhesive is a urethane adhesive.

4. The material of claim 1 wherein at least one said layer of fabric is a microdenier polyester weave.

5. A fluid and viral impermeable material comprising a first layer of fabric; a first layer of microporous urethane film overlaying said fabric layer and secured thereto with an adhesive; a second layer of microporous urethane film overlaying said first layer of microporous urethane film and secured thereto by a layer of breathable urethane adhesive, said first and second layers of microporous urethane film having pores of a sufficient. size such that said urethane adhesive migrates into said sores forming a continuous layer between said first and second layers of film to provide a substantially viral impervious laminated core; and a second layer of fabric overlaying said second layer of microporous urethane film and secured thereto by an adhesive.

6. The material of claim 5 wherein said first layer of fabric is a polyester knit.

7. The material of claim 5 wherein said second layer of fabric is a polyester weave.

8. The material of claim 7 wherein said second layer of fabric is a microdenier polyester weave.

9. A viral impermeable material comprising a substantially viral impervious laminated core having a first layer of microporous urethane film, a second layer of microporous urethane film, a layer of breathable, urethane adhesive bonding said first and second layers of film to each other, and said first and second layers of film having pores of a sufficient size such that said urethane adhesive migrates into said pores forming a continuous layer between said first and second layers of film; a first layer of fabric bonded to a side of said first layer of film opposite said second layer of film so as to cover a side of said core; and a second layer of fabric bonded to a side of said second layer of film opposite said first layer of film so as to cover another side of said core.

10. The material of claim 9 wherein said first layer of fabric is a polyester knit.

11. The material of claim 9 wherein said second layer of fabric is a polyester weave.

12. The material of claim 11 wherein said second layer of fabric is a microdenier polyester weave.

\* \* \* \* \*